(12) United States Patent
Lengsfeld et al.

(10) Patent No.: US 8,146,861 B2
(45) Date of Patent: Apr. 3, 2012

(54) COMPONENT WITH CARBON NANOTUBES

(75) Inventors: Hauke Lengsfeld, Helmste (DE); Felix Caspar Helfrich, Hamburg (DE); Hans Marquardt, Fredenbeck (DE)

(73) Assignee: Airbus Deutschland GmbH, Hamburg (DE)

( * ) Notice: Subject to any disclaimer, the term of this patent is extended or adjusted under 35 U.S.C. 154(b) by 754 days.

(21) Appl. No.: 12/260,165

(22) Filed: Oct. 29, 2008

(65) Prior Publication Data

US 2009/0140098 A1    Jun. 4, 2009

Related U.S. Application Data

(60) Provisional application No. 61/004,683, filed on Nov. 29, 2007.

(51) Int. Cl.
*B64C 1/10* (2006.01)
(52) U.S. Cl. ...................................... 244/121
(58) Field of Classification Search .......... 244/119–121, 244/117 R
See application file for complete search history.

(56) References Cited

U.S. PATENT DOCUMENTS

| 7,863,381 | B2 * | 1/2011 | Nelson et al. ................ 525/107 |
| 7,931,958 | B2 * | 4/2011 | Arai et al. .................. 428/297.4 |
| 7,947,773 | B2 * | 5/2011 | Hansen et al. ................ 524/434 |
| 2004/0144963 | A1 | 7/2004 | Braig et al. | |
| 2006/0274049 | A1 | 12/2006 | Spath et al. | |

FOREIGN PATENT DOCUMENTS

| DE | 10259498 | 7/2004 |
| DE | 102006017695 | 10/2007 |
| WO | WO 02/076430 | 10/2002 |
| WO | WO 03/078317 | 9/2003 |
| WO | WO 2004/097852 | 11/2004 |
| WO | WO 2005/117211 | 12/2005 |
| WO | WO 2006/128403 | 12/2006 |
| WO | WO 2008/045109 | 4/2008 |

OTHER PUBLICATIONS

German Office Action dated Jun. 16, 2008.

* cited by examiner

*Primary Examiner* — Richard Price, Jr.
(74) *Attorney, Agent, or Firm* — Jenkins, Wilson, Taylor & Hunt, P.A.

(57) ABSTRACT

The present invention relates to a component, in particular in the field of aviation and spaceflight, having a resin matrix in which carbon nanotubes are embedded for high conductivity of the component.

7 Claims, 2 Drawing Sheets

(A-A)

(B)

(A-A)

COMPONENT WITH CARBON NANOTUBES

RELATED APPLICATIONS

The presently disclosed subject matter claims the benefit of U.S. Provisional Patent Application Ser. No. 61/004,683, filed Nov. 29, 2007; the disclosure of which is incorporated herein by reference in its entirety.

FIELD OF THE INVENTION

The present invention relates to a component, in particular in the aviation and aerospace field, to an aircraft or spacecraft having a component such as this, to a fibre semi-finished product for the production of a component such as this, to a method for the production of a component such as this, and to the use of carbon nanotubes as lightning protection material.

BACKGROUND OF THE INVENTION

Although applicable to any desired fields of technology, the present invention and the underlying problems will be explained in more detail in conjunction with lightning protection in an aircraft.

A conventional aluminium skin of an aircraft typically comprises inherent lightning protection: The aluminium skin is highly electrically conductive throughout. This high conductivity prevents the extremely high current densities which are produced by a lightning strike leading, for example, to puncturing of the skin.

The provision of lightning protection for a skin composed of conductive fibre composite material is, on the other hand, considerably more difficult since it is not composed of a homogenous structure and is considerably less conductive than aluminium.

One approach for lightning protection for a skin composed of conductive fibre composite material provides for copper-mesh materials to be laminated into this skin. For connection over a large area, a plurality of copper-mesh material layers which are arranged essentially alongside one another are arranged overlapping in their edge areas in order to ensure the charge is passed on between the copper-mesh material layers. However, these overlaps disadvantageously lead to ripples in the skin.

Since the copper-mesh materials are in the form of woven fabric, their structure is not homogenous, either, and sparks can therefore be formed.

Furthermore, the copper-mesh material is difficult to machine and must therefore be laid by hand, which is associated with high costs.

Another disadvantage is the heavy weight of copper-mesh material.

SUMMARY OF THE INVENTION

An object of the present invention is therefore to provide better lightning protection, in particular in the field of aviation and spaceflight, and/or an improved method for the production of lightning protection such as this.

According to the invention, this object is achieved by an aircraft or spacecraft having the features of patent Claim 1.

A component is accordingly provided having a resin matrix in which carbon nanotubes are embedded for high conductivity of the component.

In addition, an aircraft and spacecraft having a component such as this is provided.

Furthermore, a fibre semi-finished product is provided for the production of a component, in particular in the field of aviation and spaceflight, having a fibre material which is pre-impregnated with a resin matrix with carbon nanotubes for high conductivity of the component.

A method is also provided for the production of a component, in particular in the field of aviation and spaceflight, having the following steps: mixing of carbon nanotubes with an uncured resin matrix for high conductivity of the component to be produced, in order to form a heterogeneous mixture, after which the heterogeneous mixture is cured in order to form the component.

The use of carbon nanotubes as lightning protection material is also proposed.

One idea on which the invention is based is to use carbon nanotubes, whose conductivity is very much higher, in particular, than copper. The carbon nanotubes allow the charge, in particular from a lightning strike, to be dissipated very much more quickly and without sparks being formed. Furthermore, the fibre semi-finished products according to the invention can be machined easily.

Carbon nanotubes, also referred to as carbonanotubes, are produced, for example, by means of chemical deposition. In this case, a gas containing carbon is decomposed by means of or on a catalyst, in such a way that the carbon which is released condenses on catalyst particles, where it forms tubes.

The carbon nanotubes must make up a sufficient proportion of the component to ensure high conductivity for the component. This proportion depends on a multiplicity of factors, in particular the chemical composition of the resin matrix and the size of the carbon nanotubes.

The dependent claims result in advantageous refinements and developments of the invention.

In the present case, the expression "high conductivity" means a conductivity which is higher than that of a component composed of conventional carbon fibre composite material.

In the present case, the expression "fibre material" means any fibre structure, in particular unidirectional fibre structures, fibre woven fabrics and/or fibre felt material. By way of example, the fibres thereof may be selected from the group including carbon fibres, glass fibres and/or aramide fibres.

According to one preferred development of the component according to the invention, a fibre material, in particular a carbon fibre material, is also embedded in the resin matrix. It is thus possible to produce a component which has very high conductivity and can thus act as lightning protection while having very high strength at the same time.

According to a further preferred development of the component according to the invention, the resin matrix forms an outer layer of the component. This advantageously allows the electrical charge introduced from the lightning to be distributed over the surface so that the electrical charge does not penetrate deeply at all into the component first.

According to a further preferred development of the component according to the invention, this component has at least one inner layer composed of fibre composite material, to which the outer layer is adjacent. In this development, the resin matrix with the carbon nanotubes is supported by means of the fibre composite material located underneath it, thus resulting in a component whose surface is highly conductive and which is very strong overall. In the present case, the expression a "fibre composite material" means a fibre material which is impregnated with a resin matrix, in particular also a pre-impregnated fibre material (prepreg).

According to one preferred development of the aircraft or spacecraft according to the invention, the component is part of a skin of the aircraft or spacecraft. In particular, the component forms a segment of the wing, fuselage and/or empennage skin. The resin matrix with the carbon nanotubes in this case forms the outer surface of the skin. Lightning strikes can therefore be passed quickly over the outer surface of the aircraft or spacecraft.

According to a further preferred development of the aircraft or spacecraft according to the invention, at least one discharge device is preferably directly electrically conductively coupled to the component, for emission of charge to the atmosphere. In the present case "directly" means that the discharge device and the component rest on one another; for example, the discharge device may be laminated into the resin matrix. One example of a discharge device such as this is so-called "static dischargers", such as those which are typically provided on the trailing edge of a wing. Static charge can therefore also be emitted by means of the component according to the invention to the atmosphere, by means of coupling to the discharge device.

According to a further preferred development of the aircraft or spacecraft according to the invention, a current source, in particular an induction device, is provided, by means of which an electric current can be produced in the component in order to heat it, in order in particular to deice the component and/or an area adjacent to the component. Instead of an induction device, it is, of course, also possible to use electrical cables which are connected to the component, in order to supply this current. Accordingly, the component according to the invention is not just suitable for lightning protection. Additionally or alternatively, the component can be used in conjunction with a current source as a heating device, for example for deicing a wing. The carbon nanotubes should for this purpose preferably make up a proportion of the component such that this results in the component having a suitable electrical resistance, which then produces a suitable heating power when current flows through it, that is to say it emits heat.

According to a further preferred development of the fibre semi-finished product according to the invention, this fibre semi-finished product has a supporting paper to which the pre-impregnated fibre material is applied. This development is particularly suitable for processing by means of an automatic tape-layer.

According to a further preferred development of the method according to the invention, a fibre material, in particular a carbon fibre material, is infiltrated with the heterogeneous mixture before curing. This makes it possible to produce a highly conductive component, which is very strong at the same time, in a very simple manner. The fibre material can, for example, be provided as a layer, in which case, after the infiltration, it can be used as a prepreg and, for example, can be laid by means of an automatic tape-layer. By way of example, a plurality of such layers can then also be arranged one on top of the other and are then cured to form the component. A number of these layers may, of course, be provided with a resin matrix without the carbon nanotubes.

According to one preferred development of the method according to the invention, the heterogeneous mixture is applied, before curing, to a cured or uncured fibre composite material. This results in a component with a first highly conductive layer and a second very strong layer, which supports the first layer. This accordingly allows fibre composite materials which have already been cured to also be coated with the resin matrix subsequently.

According to a further preferred development of the method according to the invention, the fibre material is applied with the heterogeneous mixture, in particular in the form of a tape, before curing to a cured or uncured fibre composite material, in particular by means of an automatic tape-layer. The fibre composite material is preferably also provided as a tape, and is processed by means of the tape-layer.

According to a further preferred development of the method according to the invention, the curing of the heterogeneous mixture also comprises the curing of the uncured fibre composite material. Curing is accordingly carried out efficiently in one step.

BRIEF DESCRIPTION OF THE DRAWINGS

The invention will be explained in the following text using exemplary embodiments and with reference to the attached figures, in which.

In the figures, the same reference symbols denote identical or functionally identical components, unless stated to the contrary.

DETAILED DESCRIPTION OF THE INVENTION

In the figures, x denotes the aircraft longitudinal direction from the nose to the tail of the aircraft, y the aircraft lateral direction from starboard to port seen in the aircraft longitudinal direction x, and z the aircraft vertical direction.

Figure 1:
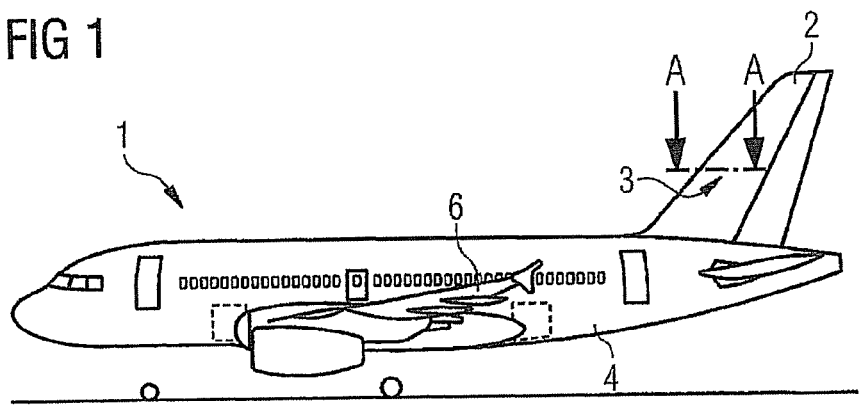
FIG. 1 shows a side view of an aircraft according to one exemplary embodiment of the present invention.

FIG. 1 shows an aircraft 1 with a skin which may be subject to lightning strikes. An area of the skin of the fin and rudder assembly 2, which is intended to be protected against lightning strikes, is annotated with the reference symbol 3. Any other area of the aircraft skin, for example the fuselage skin 4 or else the wing skin 4 could also, of course, have a structure as will be explained in more detail in the following text in conjunction with the area 3.

Figure 2:
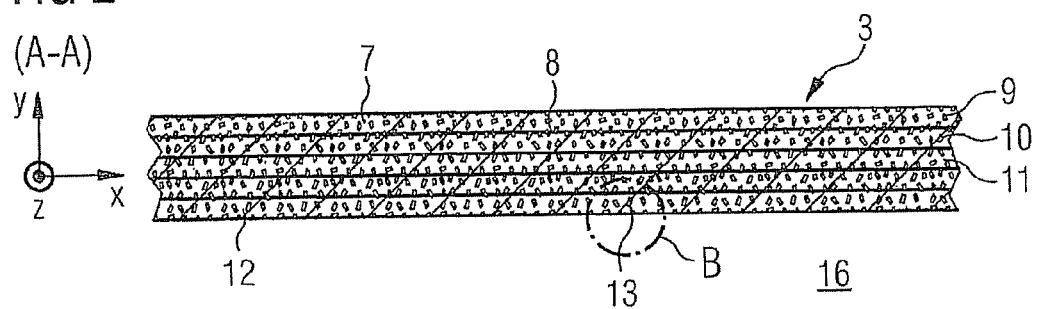
FIG. 2 shows a section A-A from FIG. 1.
Figure 3:
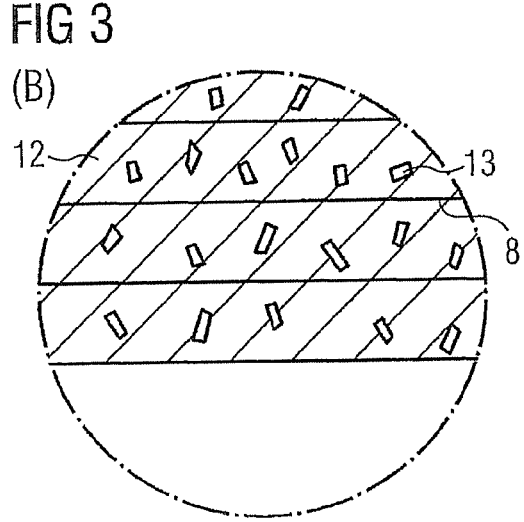
FIG. 3 shows an enlarged view B from FIG. 2.

FIG. 2 shows a partial section A-A through the area 3 which has the component 7 according to the invention. FIG. 3 shows an enlarged detail B from FIG. 2.

The component 7 has carbon fibres (for example provided with the reference symbol 8) which extend on its plane (x-z) and are embedded in a resin matrix 12.

The resin matrix 12 has carbon nanotubes (for example provided with the reference symbol 13). The carbon nanotubes make up a sufficiently high proportion of the volume of the component 7 that it is highly conductive in order to distribute charge which results in particular from a lightning strike. In particular, the carbon nanotubes 13 are packed sufficiently tightly in the resin matrix 12 that individual carbon nanotubes touch one another.

The component 7 is advantageously formed from a plurality of layers 9, 10, 11 of a fibre semi-finished product which has the fibres 8 which are pre-impregnated with the resin matrix 12. For this purpose, the layers 9, 10, 11 are formed by means of an automatic tape-layer (not illustrated), and are then cured to form the component 7. One or more layers, for example the layer 11, may also, of course, be formed from a fibre semi-finished product with fibres 8 which are pre-impregnated with a resin matrix 12a without carbon nanotubes 13.

Figure 4:
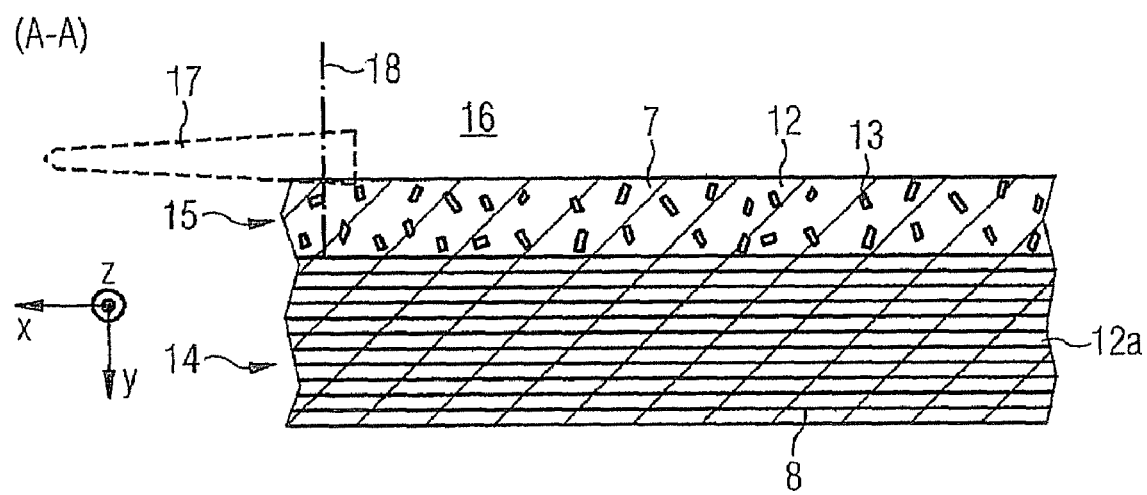
FIG. 4 shows the section A-A from FIG. 1 according to a further exemplary embodiment of the invention.

FIG. 4 shows the component 7 according to a further exemplary embodiment of the present invention.

In this component 7, an inner layer 14 is arranged internally with respect to an outer layer 15 which makes contact with the atmosphere 16. The inner layer 14 has carbon fibres 8 which are embedded in a resin matrix 12a. The outer layer 15 has carbon nanotubes 13 which are embedded in a resin matrix 12. The resin matrices 12 and 12a may have the same or a different chemical composition.

By way of example, the layer 15 may be produced by subsequent application of the resin matrix 12 with the carbon nanotubes 13 to the layer 14 composed of cured fibre composite material, after which the layer 15 is cured.

Alternatively the layer 15 can be produced by application of the resin matrix 12 to the layer 14 composed of (uncured) fibres 8 which have been pre-impregnated with the resin matrix 12a, with the layers 14 and 15 being cured jointly to form the component 7.

The carbon nanotubes 13 make up a sufficiently high proportion of the volume of the layer 15 that it has high conductivity in order to distribute charge which results in particular from a lightning strike. The inner layer 14 in contrast has high strength because of the fibres 8, and supports the outer layer 15.

If, for example, the component 7 according to the invention is used as a wing skin 6, the outer layer 15 can make electrically conductive contact with a discharge device 17 ("discharger rod"—illustrated by way of example in FIG. 4). Charge which has accumulated on the outer layer 15 can be emitted to the atmosphere 16 by means of the discharge device 17. An attachment means, for example a screw 18, connects the discharge device 17 mechanically, or else conductively, to the component 7. The discharge device 17 is preferably laminated into the component 7.

As an alternative or in addition to the exemplary embodiments described above, the component 7 may be electromagnetically coupled to an induction device 18 (see FIG. 1). By way of example, the induction device 18 may be accommodated in the fin and rudder assembly box or else in the wing box for the situation in which the component 7 is provided in the area of the wing skin 6. In this case, the carbon nanotubes 13 make up a sufficient proportion of the component 7 to ensure that the component 7 has a suitable electrical resistance which then produces a suitable heating power, that is to say it emits heat, when a current is induced in it by means of the induction device 18. The heating power that is produced then deices the component 7 itself and the areas 3 and 6.

Although the present invention has been described in conjunction with a plurality of exemplary embodiments, it is not restricted to them but can be modified in many ways.

The component according to the invention is also highly suitable for thermal applications, for example in the field of heat conductors in electronics.

The present invention provides a component, particularly in the field of aviation and spaceflight, having a resin matrix in which carbon nanotubes are embedded for high conductivity of the component. The invention avoids the need for complex processing of copper-mesh materials which have been used as lightning protection material until now. Furthermore, the use of carbon nanotubes also results in a very much higher conductivity than in the case of copper-mesh materials.

What is claimed is:

1. Aircraft or spacecraft, comprising a component having a resin matrix in which carbon nanotubes are embedded for providing a high conductivity of the component, wherein a current source is provided, the current source being adapted to produce an electric current in the component for heating-up the same in order to defrost the component or an area adjacent to the component.

2. Aircraft or spacecraft according to claim 1, further comprising a carbon fibre material embedded in the resin matrix.

3. Aircraft or spacecraft according to claim 1, wherein the resin matrix forms an outer layer of the component.

4. Aircraft or spacecraft according to claim 3, wherein the component comprises at least one inner layer composed of fibre composite material, to which the outer layer is arranged adjacent.

5. Aircraft or spacecraft according to claim 1, wherein the component is part of a skin of the aircraft or spacecraft.

6. Aircraft or spacecraft according to claim 1, wherein at least one discharge device is electrically conductively coupled to the component, for emission of charge to the atmosphere.

7. Aircraft or spacecraft according to claim 1, wherein the current source is designed as an induction device.

* * * * *